United States Patent [19]

Nightingale

[11] Patent Number: 5,136,597
[45] Date of Patent: Aug. 4, 1992

[54] POYNTING VECTOR WALK-OFF COMPENSATION IN TYPE II PHASEMATCHING

[75] Inventor: John L. Nightingale, Portola Valley, Calif.

[73] Assignee: Coherent, Inc., Palo Alto, Calif.

[21] Appl. No.: 669,905

[22] Filed: Mar. 15, 1991

[51] Int. Cl.$^5$ .............................................. H01S 3/10
[52] U.S. Cl. ........................................ 372/21; 372/22; 372/105; 359/330; 359/328
[58] Field of Search ........................... 372/21, 22, 105; 359/330, 338

[56] References Cited

U.S. PATENT DOCUMENTS

| | | | |
|---|---|---|---|
| 4,879,722 | 11/1989 | Dixon et al. | 372/21 |
| 5,033,057 | 7/1991 | Bosenberg et al. | 359/330 |
| 5,047,668 | 9/1991 | Bosenberg | 372/20 |

OTHER PUBLICATIONS

J. Falk and J. E. Murray, "Single-Cavity Noncollinear Optical Parametric Oscillation", Apr. 15, 1969, *Applied Physics Letters*, vol. 14, No. 8., pp. 245–247.

D. C. Hanna, B. Luther-Davies, and R. C. Smith, "Singly Resonant Proustite Parametric Oscillator Tuned From 1.22 to 8.5 μm", May 1, 1973, *Appl. Phys. Lett.*, vol. 22, No. 9, pp. 440–442.

G. C. Bhar and U. Chatterjee, "Analyses of Phase–Matching for Noncollinear Three-Wave Mixing in Uniaxial Crystals", Jun. 1990, *Japanese Journal of Applied Physics*, vol. 29, No. 6, pp. 1103–1107.

H. Gerlach, "Difference Frequency Generation in LiIO$_3$ Using Two Tunable Dye Lasers", Dec. 1974, *Optics Communications*, vol. 12, No. 4, pp. 405–408.

Shinsuke Umegaki, Seiichi Yabumoto, and Shun-ichi Tanaka, "Noncollinearly Phase-Matched Second-Harmonic Generation in LiIO$_3$", Oct. 15, 1972, *Appl. Phys. Lett.*, vol. 21, No. 8, pp. 400–402.

S. C. Mehendale and P. K. Gupta, "Effect of Double Refraction on Type II Phase Matched Second Harmonic Generation", Oct. 15, 1988, *Optics Communications*, vol. 68, No. 4, pp. 301–304.

*Primary Examiner*—Georgia Y. Epps
*Attorney, Agent, or Firm*—Limbach & Limbach

[57] ABSTRACT

An improved geometry is disclosed for enhancing the efficiency of second harmonic conversion in a Type II phasematching material. In this approach, the effects of wave vector double refraction are used to compensate for the effects of Poynting vector walk-off. To achieve this goal, the input fundamental beam 32 is arranged to enter the doubling crystal 30 at an oblique angle of incidence. This angle is selected so that the wave vector double refraction angle is equal to the Poynting vector walk-off. In order to maximize doubling efficiency, the axes of the crystal must be oriented so that the optimum phasematching angle coincides with the propagation axis of the refracted fundamental beam travelling in the crystal. The subject invention is particularly suited for use with a KTP crystal in either intracavity doubling or in an external resonant geometry.

19 Claims, 2 Drawing Sheets

POYNTING VECTOR WALK-OFF COMPENSATION IN TYPE II PHASEMATCHING

TECHNICAL FIELD

The subject invention relates to an approach for improving the efficiency of Type II phasematching, such as in KTP, by compensating for Poynting vector walk-off effects.

BACKGROUND OF THE INVENTION

It is well known that various birefringent crystals can be used to double the frequency of an incoming laser beam. For efficient frequency conversion the phasematching condition must be satisfied. Based on the method of achieving the phasematching condition, second harmonic interactions are classified as Type I and Type II. In Type I phasematching, the input fundamental beam is linearly polarized and arranged to excite only one polarization eigenstate in the crystal in order to maximize doubling efficiency. In contrast for maximum efficiency in Type II phasematching, the input fundamental beam is arranged to excite both crystal polarization eigenstates equally. This result can be achieved by properly orienting linear or elliptically polarized light, or by using circularly polarized light.

For typical Type I phasematching, the wave vectors of the fundamental and second harmonic beams are collinear. The fundamental beam excites one polarization eigenstate and the second harmonic beam is generated in the orthogonal polarization eigenstate. In typical Type II phasematching the wave vectors of all beams are collinear, however, the situation is more complex since there are now two excited fundamental polarization eigenstates (denoted with subscripts 1 and 2) and a generated second harmonic beam in one of these polarization eigenstates.

In order to have efficient second harmonic generation for either a Type I or Type II nonlinear interaction the phasematching condition must be satisfied. The phasematching condition for Type II phasematching is expressed mathematically as the following:

$$k_1^{(\omega)} + k_2^{(\omega)} = k_1^{(2\omega)} \text{ or } k_2^{(2\omega)} \quad (1)$$

where $k_{1,2}^{(\omega)}$ denotes the wave vectors of the orthogonally polarized input beams and $k_{1,2}^{(2\omega)}$ denotes the wave vector of the second harmonic beam. For notational simplicity we will drop the superscript $(\omega)$ when referring to the fundamental beam in the following discussion. The polarization state of the second harmonic beam (1 or 2) depends on the sense of the crystal's birefringence.

Typically all the wave vectors in the above expression are collinear, however, the direction of power flow associated with each beam (Poynting vector S) is in general not collinear with its associated wave vector, k. More particularly, if the direction of travel of the beam is not parallel to the crystal's optical axes, the direction of the Poynting vector, S, will be different from the wave vector k. The walk-off angle $\rho$, between the two vectors is defined as follows:

$$\rho = \text{arctangent } |D \times E/(D \cdot E)| \quad (2)$$

where D is the displacement vector and E is the electric field vector of the beam. Because of the crystal birefringence and dispersion, the index of refraction will be different for each beam and thus each beam will propagate differently. Accordingly, the walk-off angle $\rho$ associated with each of the Poynting vectors will in general be of different magnitude and in a different direction.

The phenomenon is illustrated in FIG. 1 wherein block 10 represents a crystal oriented for Type II phasematching. The incoming beam 20 enters the crystal normal to its face. The wave vectors $k_1$ and $k_2$ associated with the orthogonal displacement field vectors $D_1$ and $D_2$ travel collinearly with the input fundamental beam. However, each of the two Poynting vectors $S_1$ and $S_2$ separate from the associated wave vectors at the angles $\rho_1$ and $\rho_2$ respectively. When the light energy at the fundamental wavelength leaves the crystal the two Poynting vectors will be parallel but separated by a distance d. It should be remembered that the Poynting vectors define the actual direction of travel of the power of the beam while the wave vectors represent the direction orthogonal to beam phase fronts.

FIG. 2 illustrates the problem as it generally occurs in a KTP crystal oriented for Type II phasematching of a 1064 nm fundamental beam. In this case, the incoming fundamental beam 22 is oriented in a manner such that the wave vector $k_2$ (associated with the $D_2$ polarization state) is aligned with the crystallographic axes such that there is no walk-off with the associated Poynting vector $S_2$. However, due to the different index of refraction with respect to the $D_1$ polarization state, there will be a non-zero walk-off angle $\rho$ between the $k_1$ wave vector and the $S_1$ Poynting vector. The generated second harmonic is in the subscript 1 polarization state and also experiences walk-off from its associated wave vector which is collinear with the two fundamental wave vectors. The prior literature often refers to the walk-off between second harmonic $k_1^{(2\omega)}$ and $S_1^{(2\omega)}$ Vectors as the walk-off angle associated with this nonlinear interaction. However, as discussed the situation is actually more complex since two of the three beams involved in the interaction experience some walk-off. When the energy flow leaves the KTP crystal, the two Poynting vectors ($S_1$ and $S_2$) will once again be parallel, but spaced apart a distance d. While the subject invention will be described with reference to the situation where only one of the two fundamental beam Poynting vectors experiences walk-off from the associated wave vector, it is equally applicable to the more general situation illustrated in FIG. 1.

The Poynting vector walk-off effect in KTP is well known and can be calculated. For example, in a KTP crystal where the beam is directed along the optimum phasematching angle of about 23.32 degrees for 1064 nm light, the walk-off angle $\rho$ between $k_1$ and $S_1$ will be about 0.2 degrees. Assuming a crystal length of 5 mm, and recalling that $S_2$ experiences no walk-off, the separation d, or walk-off between the vectors upon exiting the crystal, will be about 17 microns. For the second harmonic beam, the walk-off angle between $k_1^{(2\omega)}$ and $S_1^{(2\omega)}$ is slightly different due to crystal dispersion, being 0.26°.

Poynting vector walk-off of all forms is undesirable in second harmonic interactions. Poynting vector walk-off of the orthogonally polarized fundamental beams is particularly undesirable in intracavity second harmonic generation because it leads to parasitic intracavity losses and reduces doubling efficiency. For example, the beam radius within a KTP crystal used in a typical diode-pumped intracavity frequency doubled system is about 50 microns. Assuming a Poynting vector walk-off of 17 microns, it can be seen that significant beam distortion and spatial variation of the polarization states can occur, leading to reduced efficiency.

Practitioners in the prior art addressed the problem in two ways. First, the length of the crystal was kept relatively short to minimize the separation d between the vectors upon exiting the crystal. Unfortunately, doubling efficiency is related to the length of the crystal so this approach will prevent higher efficiencies from being attained.

Another method of minimizing the effects of walk-off is to expand the diameter of the beam so that distortion effects are minimized. The latter approach also has drawbacks because for a given power, doubling efficiency is decreased when the spot size in the crystal is increased. Accordingly, it would be desirable to find an approach which minimizes the effects of Poynting vector walk-off without reducing doubling efficiency.

Another well known phenomenon is the refraction effect which occur when a beam enters an input face of a material at an oblique angle of incidence. More particularly, the wave vector k of a light beam will be refracted from the incoming path according to Snell's law which relates the angles of incidence and the angles of refraction with the index of refraction of the materials on either side of the interface.

As noted above, in the case of birefringent crystals, the index of refraction for the two polarization states will be different. Accordingly, if the input fundamental beam enters the crystal at an oblique angle of incidence, the wave vectors associated with the two polarization states ($k_1$ and $k_2$) will be refracted by different amounts. The magnitude of this effect is governed by the orientation of the interface relative to the crystals axes and the angle of incidence of the incoming light. In the prior literature, this effect is sometimes referred to as double refraction. Unfortunately, the term double refraction has also been used in the literature to refer to Poynting vector walk-off and the combination of these two distinct physical effects. Therefore, for clarity in this application, the effect will be referred to as wave vector double refraction.

FIG. 3 illustrates the effect of wave vector double refraction. In FIG. 3, the Poynting vectors are not illustrated. As can be seen, a fundamental beam of light 24 enters crystal 10 at an oblique angle of incidence $\theta$. The two wave vectors $k_1$ and $k_2$ are refracted different amounts and this difference can be expressed as the intermediate angle $\delta$. The magnitude of the difference in the amount of refraction associated with the two polarization states is given by the following formula:

$$\delta = \arcsin(\sin\theta/n_1) - \arcsin(\sin\theta/n_2) \qquad (3)$$

where $\theta$ is the angle of incidence, $n_1$ is the index of refraction for the $D_1$ displacement field vector, $n_2$ is index of refraction for the $D_2$ displacement field vector and the index of refraction of the surrounding medium (air) is 1. As will be discussed below, by properly arranging the angle of incidence of the beam as well as the axes of the crystal with respect to the input face, wave vector double refraction can be used to compensate for Poynting vector walk-off.

In the prior art, much effort has been expended in determining the ideal phasematching angle of a crystal. More particularly, there is some loci of directions, which satisfy the phasematching condition. In general one of these directions has the largest effective nonlinear coefficient and is the direction along which an input beam can be passed in order to optimize the doubling efficiency of a crystal. As noted above, in KTP, which is the most common crystal used for Type II phasematching, the optimum phasematching angle is 23.32 degrees off the x-axis and 90 degrees off the z-axis for doubling 1064 nm light using collinear wave vectors.

In prior art doubling systems, the crystal has been fabricated such that a normal to the input face forms an angle 23.32 degrees off the x-axis and 90° off the z-axis. The input beam is then directed into the crystal normal to the input face to insure that optimum phasematching is achieved. In this geometry there will be no wave vector double refraction. As will be seen below, the prior art geometry is changed in the subject invention, wherein the incoming beam is directed at an oblique angle of incidence to the input face to create wave vector double refraction effects which can then be used to compensate for the Poynting vector walk-off effects. In addition, the crystalline axes are oriented with respect to the input face to create the optimum phasematching angle with respect to the refracted beam travelling in the crystal.

For more complete background information on nonlinear optical interaction see *Nonlinear Optics*, P. G. Harper and B. S. Wherett, Eds. San Francisco, Calif.: Academic, 1977 pgs. 47-160.

SUMMARY OF THE INVENTION

In accordance with the subject invention, a new geometry is proposed for use in Type II phasematching in order to compensate for the effects of Poynting vector walk-off. As noted above, in order to maximize doubling efficiency in Type II phasematching, the fundamental beam is typically directed within the crystal along an optimum angle which is not aligned with the crystal axes. Accordingly, the direction of power flow will generally not be the same for both polarization eigenstates due to Poynting vector walk-off.

The angle between the Poynting vectors can be readily calculated. This effect can be offset by creating an equivalent angular difference in the direction of the wave vectors. The latter result is achieved by directing the beam at the input face of the crystal at a particular oblique angle of incidence. This geometry will result in the fundamental beam propagating through the crystal at some other angle (defined by Snell's law) that is not parallel to a normal to the surface of the crystal. Therefore, in order to maximize doubling efficiency, the axes of the crystal must also be arranged so that the optimum phasematching angle coincides with the propagation axis of the fundamental radiation travelling in the crystal. In practice, this will mean that the optimum phasematching angle will not be aligned with a normal to the input face of the crystal as in the prior art, but be offset by some fixed amount based on the direction of the axis of the fundamental beam within the crystal.

The subject approach can be used to improve the conversion efficiency of Type II phasematching in a single pass geometry as well as resonant ring geometries and for intracavity doubling. In addition, the subject approach can be used to improve other nonlinear interactions such as sum or difference frequency generation. The subject invention can also be employed to improve the characteristics of transmission of a beam through a birefringent crystal independent of nonlinear interactions requiring phasematching conditions.

Further objects and advantages of the subject invention will become apparent from the following detailed description taken in conjunction with the drawings in which:

DETAILED DESCRIPTION OF THE PREFERRED EMBODIMENTS

Figure 4:
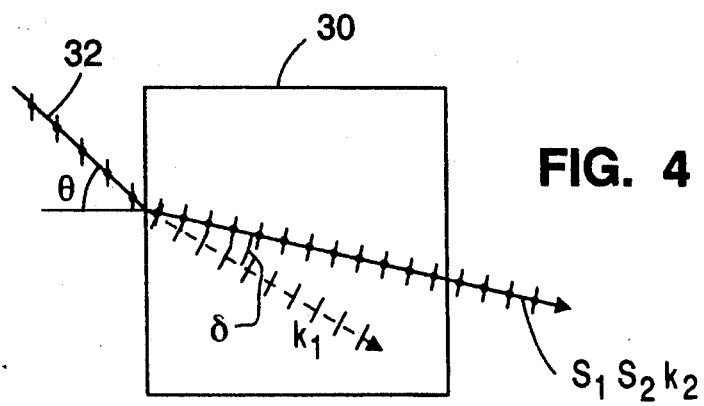
FIG. 4 is an illustration of the geometry of the subject invention wherein the wave vector double refraction is used to compensate for the Poynting vector walk-off in a Type II phasematching interaction.

Referring to FIG. 4, there is illustrated a crystal 30 fabricated and oriented for Type II phasematching. Presently, KTP ($KTiOPO_4$) is the principal material used in Type II phasematching second harmonic generation. Accordingly, the following discussion will use second harmonic generation of 532 nm radiation in KTP as an example. However, it should be understood that the subject invention could be utilized with any material or wavelength where Type II phasematching is used.

The optimum phasematching conditions for KTP has been extensively studied. The optimum phasematching angle for collinear k vectors for 1064 nm fundamental light at room temperature has been reported to be at 23.32 degrees from the x-axis and 90 degrees from the z-axis. (See Stolzenberger, Applied Optics, Vol 27, page 3883, 1988). It should be noted that there is no universal agreement about this angle among researchers. Some of the disparity can be traced to the fact that there may be some variation in performance in different KTP samples.

For a light beam having its wave vectors along this direction, the two polarization states will be oriented either perpendicular to the k vector in the x-y plane (hereinafter referred to as the $D_1$ displacement field vector) or parallel to the z-axis (hereinafter referred to as the $D_2$ displacement field vector). As noted above, because of the birefringent properties of KTP, the refractive indices for these two polarization states are different. For this case, the refractive indices were calculated as being 1.746 for the $D_1$ vector and 1.833 for the $D_2$ vector. These values were based on data set forth in "Calculations of Optimum Phasematch Parameters for the Biaxial Crystal $KTiOPO_4$", Yao and Fahlen, J. Appl. Phys. Vol. 55 p. 65, 1984. Once again it should be noted that other researchers have derived different values for the refractive indices.

It should be noted that using these refractive index values yields a phasematching angle of 21.31 degrees from the x-axis in the x-y plane for 1064 nm radiation. The following calculations will use the phasematching angle of 23.32 degrees given by Stolzenberger and will calculate the necessary compensation angles using the refractive index data of Yao. The calculations are carried out to the nearest 0.01 degrees for illustrative purposes only. Practically, uncertainties of 1 degree or less in the actual value for phasematching and walk-off compensation angles are not significant.

Since the $D_2$ field vector associated with the wave vector $k_2$ is parallel to the crystallographic z-axis, there is no deviation or walk-off with respect to the associated Poynting vector $S_2$. However, since the $D_1$ field vector associated with the wave vector $k_1$ is offset 23.32 degrees from the y-axis of the crystal, the associated Poynting vector $S_1$ will experience a walk-off angle $\rho$ of 0.2 degrees away from the x-axis in the x-y plane.

Figure 1:
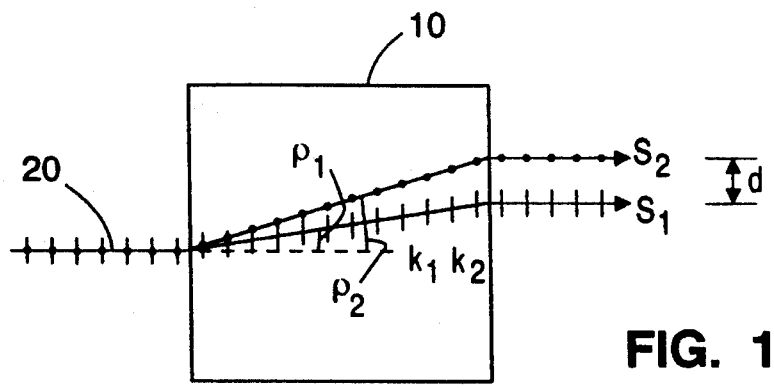
FIG. 1 is an illustration of the effects of Poynting vector walk-off in a Type II phasematching interaction experienced in prior art geometries.
Figure 2:
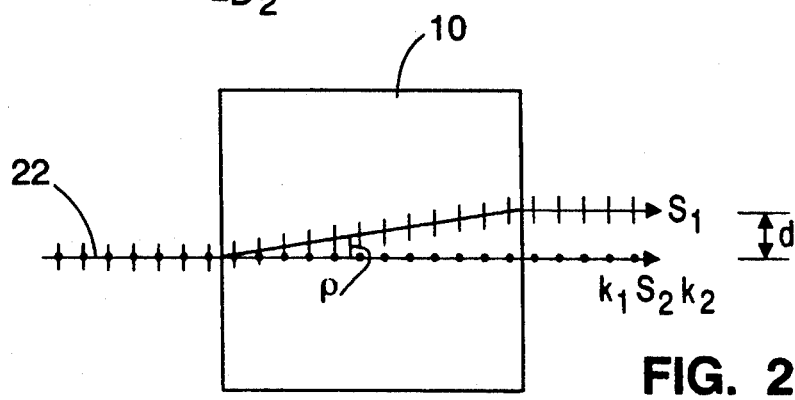
FIG. 2 is an illustration of the effects of Poynting vector walk-off typically experienced in a prior art KTP crystal.
Figure 3:
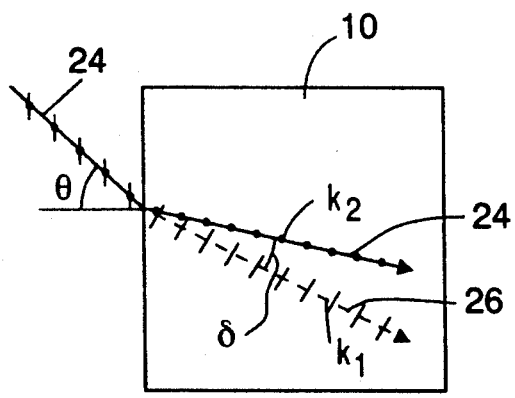
FIG. 3 is an illustration of the effects of wave vector double refraction in a birefringent material which could be used for Type II phasematching wherein the incoming fundamental beam is directed at an oblique angle of incidence to the input face of the crystal.

In accordance with the subject invention, the effects of Poynting vector walk-off can be compensated by directing the incoming fundamental beam 32 to enter the crystal at an oblique angle of incidence $\theta$. As discusses above with reference to FIG. 3, the wave vectors associated with the two polarization states will be refracted by different amounts due to the birefringence of the crystal. By properly selecting the angle of incidence ($\theta$), the wave vector double refraction angle $\delta$ can be used to compensate for the Poynting vector walk-off angle $\rho$.

The proper angle of incidence $\theta$ is chosen by setting $\delta$ (defined in equation (3)) equal to the calculated Poynting vector walk-off angle $\rho$ (defined in equation (2)) and solving for the proper angle of incidence $\theta$ for the fundamental beam. Stated differently, the proper angle of incidence is selected by simultaneously solving equations (1), (2) and (3). In the example for KTP given above, wherein the Poynting vector walk-off angle $\rho$ is determined to be 0.2 degrees, the proper angle of incidence $\theta$ would be 7.34 degrees.

As noted above, in order to maximize doubling efficiency, the KTP should be fabricated so that the beam axis in the crystal coincides with the optimum phasematching angle. In the prior art geometry, where the incoming fundamental beam was typically directed normal to the input face such that it would not be refracted at the surface, the crystal face normal was set at 23.32 degrees from the x-axis in the x-y plane.

In the subject invention, wherein the incoming fundamental beam enters the crystal at an oblique angle $\theta$ and is refracted, the axes of the crystal must be rotated to align the axis of the beam within the crystal with the optimum phasematching. Because $k_1$ and $k_2$ are no longer collinear, the optimum phasematching direction for the second harmonic wave vector is modified slightly from the collinear case. The direction for $k_1(2\omega)$ becomes 23.28 degrees from the x-axis in the x-y plane compared to 23.32 degrees from the collinear case.

The angle of refraction of the transmitted beam entering at an oblique angle of incidence $\theta$ of 7.34 degrees would be 4.21 degrees for $k_1$ and 4.01 degrees for $k_2$ based on Snell's law. Therefore, in order to obtain the optimum phasematching condition, the normal to the input face of the crystal should be 27.39 degrees $[23.28+(4.21+4.01)/2]$ from the x-axis in the x-y plane.

In this case the wave vector $k_1$ associated with the $D_1$ field vector would be oriented 23.18 degrees from the x-axis and the wave vector $k_2$ associated with the $D_2$ field vector will be oriented at 23.38 degrees from x-axis. For these conditions, the sum of $k_1$ and $k_2$ yields $k_1(2\omega)$, the phasematching condition given in equation (1). The incoming beam would be incident on the crystal face at an angle of 20.05° (27.39−7.34) from the x-axis in the x-y plane.

As shown in FIG. 4, in this geometry, a wave vector double refraction angle $\delta$ will be generated between the two wave vectors $k_1$ and $k_2$. However, since the walk-off angle $\rho$ between the wave vector $k_1$ and the Poynting vector $S_1$ is equal to $\delta$, the two Poynting vectors $S_1$ and $S_2$ will be collinear and at an orientation of 23.38 degrees from the x-axis in the x-y plane and the k vectors will satisfy the phasematching condition. Accordingly, by fabricating the crystal with the end face oblique to the phasematching direction and by orienting the incoming radiation so that it is refracted to be parallel to the phasematching direction, the Poynting vector walk-off associated with the two polarization states of the fundamental beam can be compensated.

Figure 5:
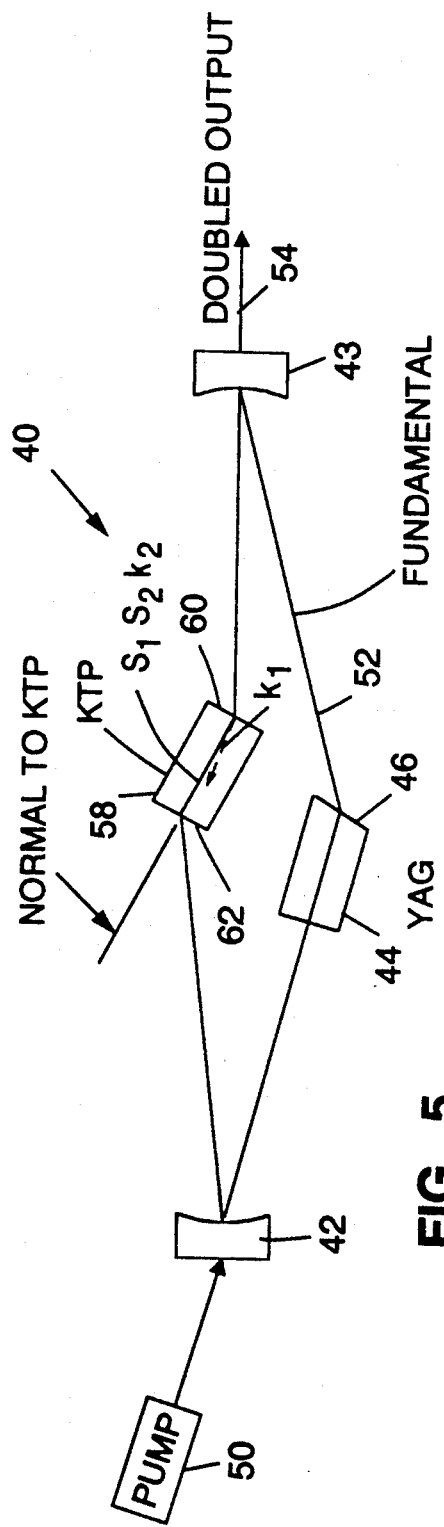
FIG. 5 is an illustration of the subject invention employed in an intracavity doubling geometry.

FIG. 5 illustrates the subject invention applied to a laser 40 wherein the KTP is used in an intracavity doubling configuration. Laser 40 includes a resonant ring cavity defined by a pair of mirrors 42 and 43. A gain medium 44 is located in the cavity and can be formed from Nd:YAG. One face 46 of the gain medium is cut at an angle to refract the beam so that a ring geometry can be formed. Such a ring geometry is described in copending application Ser. No. 509,627, filed Apr. 13, 1990 and incorporated herein by reference.

The gain medium 44 is excited by the beam from a pump source 50 which can be defined by a diode laser. In this configuration, mirror 42 transmits the pump light wavelength of 808 nm and is reflective of the circulating fundamental 1064 nm radiation beam 52. Mirror 43 is reflective at 1064 and transmissive at the 532 nm doubled output wavelength beam 54.

In accordance with the subject invention, a block 58 of KTP is located in the ring path of the fundamental beam 52. As noted above, the crystal is oriented such that the fundamental beam strikes the input face 60 at an oblique angle of incidence $\theta$ equal to 7.34 degrees. This oblique angle of incidence produces an angle $\delta$ between the wave vectors equal to 0.20 degrees which compensates for the Poynting vector walk-off in the crystal. Optimum phasematching will occur if the normal to the input face of the crystal is 27.39 degrees from the x-axis in the x-y plane.

In the illustrated embodiment, the end faces 60, 62 of the crystal 58 are parallel so either can be defined as the input face. It may be possible in certain cavity configurations to have the two end faces in a non-parallel orientation.

A laser formed in accordance with the lay-out shown in FIG. 5 was built and tested. In this experiment, the fundamental beam was linearly polarized and the ring was operated in a unidirectional manner. The KTP crystal was oriented such that both eigenstates were excited. Using a laser diode having an output of 500 milliwatts and a conventionally cut KTP crystal oriented such that the input fundamental beam is normal to the input face, a doubled 532 nm output of 15 milliwatts was generated. In contrast, when the KTP crystal formed in accordance with the subject invention was placed in the cavity such that the proper angle of incidence was defined with the incoming fundamental, the output power increased to 40 milliwatts which was about 2.5 times greater than the prior art arrangement.

Figure 6:
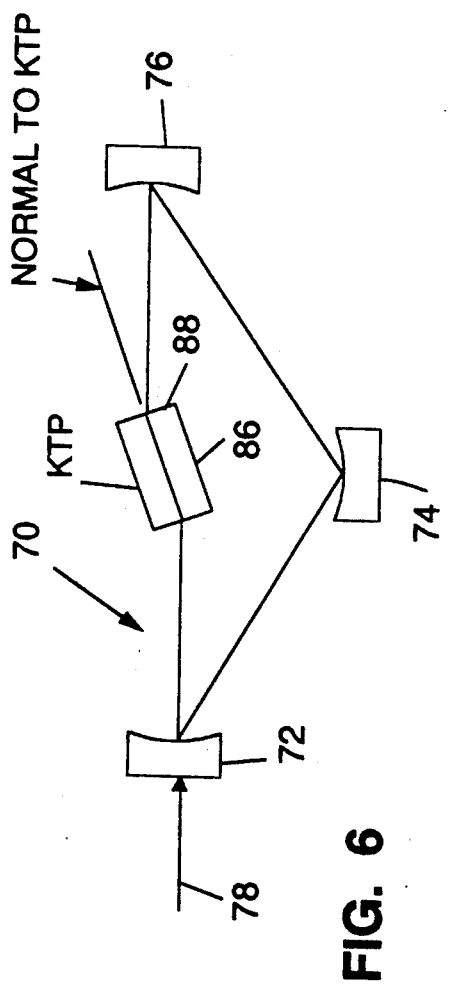
FIG. 6 is an illustration of the subject invention employed in an external resonant ring geometry.

FIG. 6 is an illustration of how the subject invention can be utilized in an external resonant ring geometry 70. In this case, the ring is defined by three mirrors 72, 74 and 76. They are arranged so that the input fundamental beam 78 will circulate in the ring. The fundamental beam 78 enters the ring through mirror 72 and at least one of the mirrors is transmissive to the doubled output wavelength.

In accordance with the subject invention, a KTP crystal 86 is located within the ring. The input face 88 is oriented such that fundamental beam enters at an oblique angle $\theta$ selected such that the wave vector double refraction compensates for the Poynting vector walk-off. The design and orientation of the crystal is the same as that described above with respect to FIG. 5.

It should be noted that both FIGS. 5 and 6 illustrate ring geometries. The subject invention can also be implemented in a linear resonant cavity or single pass geometry.

While the subject invention has been described with reference to second harmonic generation, the same approach could be used to improve the efficiency of any nonlinear interaction in a birefringent crystal. For example, the input beam to the crystal can be composed of more than one wavelength and the crystal could be used for sum or difference frequency generation. In this approach, the multiple wavelength input beams would be collinear.

As noted above, the subject compensation scheme will help maintain the shape of the beam within the birefringent crystal. Thus, the approach can also be used where it is desirable to maintain the characteristics of the beam transmitted through a birefringent crystal without regard to nonlinear interactions or proper phasematching conditions. For example, a circularly polarized beam directed into a birefringent material at normal incidence will be distorted due to Poynting vector walk-off and emerge with spatially varying polarization properties. If the input angle of the beam were modified in accordance with the subject invention, the polarization purity of the beam can be better maintained.

In summary there has been disclosed an improved geometry for enhancing the efficiency of second harmonic conversion in Type II phasematching. In the subject approach, the effects of wave vector double refraction are used to compensate for the effects of Poynting vector walk-off. To achieve this goal, the input fundamental beam 32 is arranged to enter the doubling crystal 30 at an oblique angle of incidence $\theta$. This angle is selected so that the wave vector double refraction $\delta$ is equal to the Poynting vector walk-off. In order to maximize doubling efficiency, the crystal must be fabricated so that the optimum phasematching angle coincides with the propagation axis of the refracted fundamental beam travelling in the crystal. The subject invention is particularly suited for use with a KTP crystal in either intracavity doubling or in an external resonant geometry. It could also be used in a single pass geometry and would minimize depolarization effects on the transmitted fundamental beam. By minimizing depolarization effects, the efficiency of using the fundamental beam in further harmonic generation can be improved.

While the subject invention has been described with reference to a preferred embodiment, various changes and modifications could be made therein, by one skilled in the art, without varying from the scope and spirit of the subject invention as defined by the appended claims.

I claim:

1. A device for efficient nonlinear interactions associated with a laser beam comprising:
   a birefringent crystalline material of the type that can produce an angular difference between the Poynting vectors associated with the two polarization states of a beam in the material, said material having an input face; and
   means for directing the beam into the material at an oblique input angle of incidence with respect to the input face such that refraction effects that occur at the input face produce an angular difference in the wave vectors associated with the two polarization states of the beam, with the input angle being selected such that the angular difference in wave vectors compensates for the angular difference in the Poynting vectors and wherein the crystalline axes of the material are oriented with respect to the input face to substantially satisfy the phasematching requirement.

2. A device as recited in claim 1 wherein said material is used in a Type II phasematching interaction.

3. A device as recited in claim 2 wherein said crystalline material is KTP.

4. A device as recited in claim 3 wherein said beam is a fundamental beam and said material is used for second harmonic generation.

5. A device as recited in claim 4 wherein the wavelength of the fundamental laser beam is 1064 nm and the oblique incidence angle is approximately seven degrees.

6. A device as recited in claim 5 wherein the material has three orthogonal crystalline axes defined as x, y, and z, and the optimum phasematching angle of the material is oriented at approximately 23 degrees from the x-axis and 90 degrees from the z-axis and wherein the normal to the input face of the material is located at an angle approximately 27 degrees from the x-axis and 90 degrees from the z-axis.

7. A device as recited in claim 1 wherein said laser beam includes more than one wavelength of radiation and the material is utilized for sum or difference frequency generation.

8. A device as recited in claim 1 wherein the material is located within a resonant cavity.

9. A device as recited in claim 8 wherein said resonant cavity is an external resonant ring.

10. A device as recited in claim 8 wherein said resonant cavity includes a gain medium.

11. A laser comprising:
    a resonant cavity;
    a gain medium located within the resonant cavity;
    means for exciting the gain medium to generate a laser beam within the resonant cavity; and
    a birefringent crystalline material located in the cavity, said material being of the type that can produce an angular difference between the Poynting vectors associated with the two polarization states of the laser beam in the crystal, said material having an input face, and wherein said resonant cavity is arranged so that the laser beam is directed into the material at an oblique input angle of incidence with respect to the input face such that refraction effects that occur at the input face produce an angular difference in the wave vectors associated with the two polarization states of the beam, with the input angle being selected such that the angular difference in wave vectors compensates for the angular difference in the Poynting vectors and wherein the crystalline axes of the material are oriented with respect to the input face to substantially satisfy the phasematching requirement for nonlinear interactions.

12. A laser as recited in claim 11 wherein said material is used in a Type II phasematching interaction.

13. A laser as recited in claim 12 wherein said laser beam is at a fundamental wavelength and the material functions to double the frequency of the fundamental wavelength.

14. A laser as recited in claim 13 wherein said crystalline material is KTP.

15. A laser as recited in claim 14 wherein the wavelength of the fundamental laser beam is 1064 nm and the oblique incidence angle is approximately seven degrees.

16. A laser recited in claim 15 wherein the material has three orthogonal crystalline axes defined as x, y, and z, and the optimum phasematching angle of the material is oriented at approximately 23 degrees from the x-axis in the x-y plane and 90 degrees from the z-axis and wherein the normal to the input face of the material is located at an angle approximately 27 degrees from the x-axis and 90 degrees from the z-axis.

17. A device as recited in claim 11 wherein said laser beam includes more than one wavelength of radiation and the material is utilized for sum or difference frequency generation.

18. A device for improved transmission of a laser beam through a birefringent crystal comprising:
    a birefringent crystalline material of the type that can produce an angular difference between the Poynting vectors associated with the two polarization states of the beam, said material having an input face; and
    means for directing the beam into the material at an oblique input angle of incidence with respect to the input face such that refraction effects that occur at the input face produce an angular difference in the wave vectors associated with the two polarization states of the beam, with the input angle being selected such that the angular difference in wave vectors compensates for the angular difference in the Poynting vectors.

19. A device as recited in claim 18 wherein the material is located within a resonant cavity.

* * * * *